United States Patent [19]

Weston et al.

[11] Patent Number: 6,054,977
[45] Date of Patent: *Apr. 25, 2000

[54] SCANNING CONVERTER FOR VIDEO DISPLAY

[75] Inventors: Martin Weston; Chris Owen; Simon Longcroft, all of Petersfield, United Kingdom

[73] Assignee: Snell & Wilcox Limited, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/545,679

[22] PCT Filed: Mar. 1, 1995

[86] PCT No.: PCT/GB95/00433

§ 371 Date: Jan. 19, 1996

§ 102(e) Date: Jan. 19, 1996

[87] PCT Pub. No.: WO95/24097

PCT Pub. Date: Sep. 8, 1995

[30] Foreign Application Priority Data

Mar. 1, 1994 [GB] United Kingdom ................ 9403858
Mar. 21, 1994 [GB] United Kingdom ................ 9405524
Jul. 1, 1994 [GB] United Kingdom ................ 9413286

[51] Int. Cl.$^7$ ........................................... H04N 5/20
[52] U.S. Cl. .................... 345/132; 348/443; 348/458; 348/459; 348/430
[58] Field of Search ........................... 348/441, 443, 348/497, 571, 607, 618, 619, 620, 430, 447, 448, 459, 458; 382/276, 298, 299, 349

[56] References Cited

U.S. PATENT DOCUMENTS

| 3,676,585 | 7/1972 | Kaneko et al. | 348/443 |
|---|---|---|---|
| 4,322,750 | 3/1982 | Lord et al. | 348/750 |
| 4,543,607 | 9/1985 | Taylor et al. | 358/140 |
| 4,587,556 | 5/1986 | Collins | 348/443 |
| 4,694,337 | 9/1987 | Lyons | 348/458 |
| 4,700,232 | 10/1987 | Abt et al. | 348/580 |
| 4,701,793 | 10/1987 | den Hollander et al. | 358/140 |
| 4,800,433 | 1/1989 | Kamemoto | 358/168 |
| 4,891,701 | 1/1990 | Shikina et al. | 348/451 |
| 4,941,045 | 7/1990 | Birch | 358/140 |
| 4,987,489 | 1/1991 | Hurley et al. | 358/105 |
| 5,084,755 | 1/1992 | Ozaki | 358/214 |
| 5,101,273 | 3/1992 | Gillies et al. | 358/140 |
| 5,124,804 | 6/1992 | Socarras | 348/524 |
| 5,166,792 | 11/1992 | Lyon | 348/792 |
| 5,221,966 | 6/1993 | Clayton et al. | 358/140 |
| 5,227,863 | 7/1993 | Bilbrey et al. | 348/443 |
| 5,303,045 | 4/1994 | Richards et al. | 348/443 |
| 5,327,235 | 7/1994 | Richards | 348/441 |
| 5,347,314 | 9/1994 | Faroudja et al. | 348/448 |
| 5,349,385 | 9/1994 | Glenn | 348/458 |
| 5,374,955 | 12/1994 | Furuhata et al. | 348/264 |

FOREIGN PATENT DOCUMENTS

| 0 266 079 | 5/1988 | European Pat. Off. . |
|---|---|---|
| 0 471 959 | 7/1991 | European Pat. Off. . |
| 0 650 293 | 4/1995 | European Pat. Off. . |
| WO90/13969 | 11/1990 | WIPO . |

OTHER PUBLICATIONS

Haavisto, P. et al.; "Fractional Frame Rate Up Conversion Using Weighted Median Filters"; IEEE Transactions on Consumer Electronics, vol. 35, No. 3, Aug. 1989 NY pp. 272–278, Primary Examiner—Bipin Shalwala
Assistant Examiner—Vincent E. Kovalick
Attorney, Agent, or Firm—Venable; Robert Kinberg

[57] ABSTRACT

A method of display unconversion wherein each output field line is interpolated from at least three input field lines from each of at least three input fields. By increasing the field rate by 1.5 (instead of simple field doubling) and by increasing the line rate by 1.5 (instead of simple line doubling) a substantial increase in picture quality can be achieved while maintaining data flow rates within manageable limits.

41 Claims, 4 Drawing Sheets

1.5-FIELD INTERPOLATION

SCANNING CONVERTER FOR VIDEO DISPLAY

This invention relates to the processing of video signals to provide improved displays.

It has previously been recognised that the appearance of television displays can be improved by increasing the number of fields displayed in a given time. This is particularly beneficial for displays which are larger or brighter than average because the flicker arising from normal 50 Hz (or 60 Hz in NTSC) field rates becomes more noticeable. Specifically, the eye is more sensitive to motion of bright objects in peripheral vision.

Several techniques have been proposed for doubling display field rates. In one approach, each field is displayed at two vertically offset positions. This has, however, the disadvantage that finely detailed horizontal features in the picture appear to hop up and down at the original field rate because of this vertical displacement. Also, movement in the picture becomes less smooth so that moving objects appear to judder.

In one previous attempt to reduce these difficulties, two extra fields are interposed, one after and one before alternate input fields. The resulting sequence is re-timed to give an equal time interval between the start of successive fields. Each extra field is interpolated from the adjacent original field and is vertically offset from the original fields by half a line pitch. This approach produces a picture which does not hop but there is a variation in the sharpness of finely detailed horizontal features between the original fields and the interpolated fields, which makes such features appear to twitter. The approach still suffers from motion judder.

In another prior proposal—which attempts to overcome the problem of twitter—two new fields are interpolated from every original field, offset respectively up and down one quarter of a line pitch from that original field. This reduces hop and twitter but still suffers from the disadvantages of judder and reduced vertical resolution.

It is an object of the present invention to provide an improved method of video display conversion, which provides an increased rate of field display with less problems of judder, hop, twitter and lost vertical resolution.

Accordingly, the present invention consists in a method of video display conversion which increases the rate of field display, wherein every output field from the conversion is interpolated taking information from two or more input fields.

It has been recognised in the present invention that by taking information from more than one original field to create each output field, it is possible to reduce judder significantly and at the same time to improve the vertical resolution over known approaches. It is also possible to avoid variations in vertical resolution from one output field to the other and—consequently—to remove objectionable twitter from the displayed picture.

The present invention will now be described by way of example, with reference to the accompanying drawings, in which.

Figure 1:
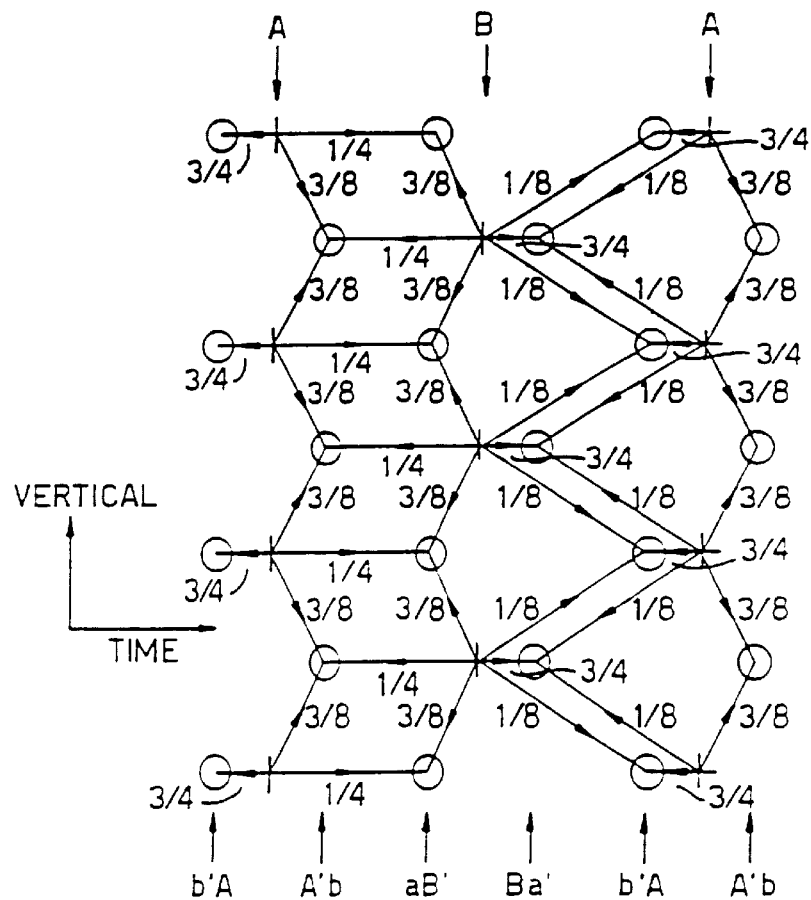
FIG. 1 is a diagram illustrating a method in accordance with the present invention in which output fields are derived in a video display conversion, doubling the field rate.

Referring initially to FIG. 1, a line in the original or input field sequence is marked "+" and a line in the interpolated or output field sequence marked "○". Arrows extending between input lines + and output lines ○ indicate contributions from the input line utilised in the interpolation process.

It will be seen that two input fields are used to create each output field and the total contribution from each input field depends inversely on the time difference between that input field and the interpolated output field in question. Thus, in the illustrated arrangement, the contributions to each output line from the nearer field (being two contributions of ⅜ or one contribution of ¾) sum to three quarters, whilst the contributions from the further field (a single contribution of ¼ or two contributions of ⅛) sum to one quarter. This greatly reduces judder.

FIG. 1 shows that the output lines are always vertically aligned with an input line on one of the input fields. Only the aligned input line is used from the aligned field; the two closest lines are used from the other input field and the contribution is split between them.

Figure 2:
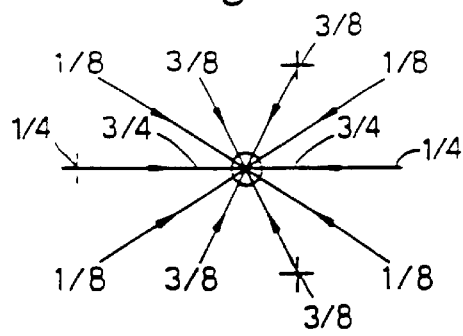
FIG. 2 is a diagram similar to FIG. 1, but introducing a new notation.

The same arrangement is shown in FIG. 2, but with a different notation that will be helpful in describing more complex embodiments of the invention. In this notation, all possible contributions to output lines ○ are shown, with the output line positions superimposed. The corresponding input lines + are shown for one example.

Figure 3:
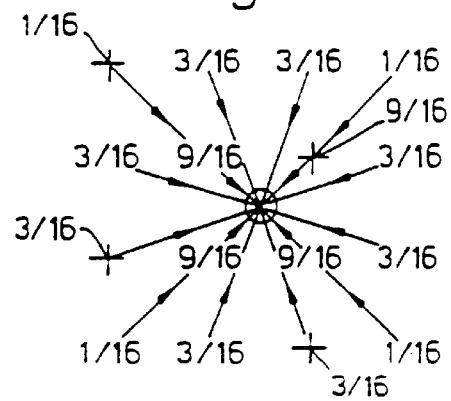
FIG. 3 is a diagram similar to FIG. 2, illustrating a modification.

Turning now to FIG. 3, the notation introduced in FIG. 2 is used to describe a modification.

It can be noted that, in the arrangement of FIG. 2, the output line is aligned with a line in one of the input fields and takes either ¼ or ¾ contribution from that input line. Two equal contributions of ⅛ or ⅜ are taken from the other input field, in which there is no aligned line. In contrast, the arrangement of FIG. 3 has output lines which are not aligned with a line in either of the two input fields. Contributions are taken essentially in the ratio 3:1 between the two closest lines. Thus, contributions are taken from two input lines in the closest input field in the amount 9/16 for the closest line and 3/16 for the further line. In the other input field, the contributions are 3/16 for the closest line and 1/16 for the further line.

This arrangement has less twitter than that of FIG. 2 but at the cost of a slight loss in vertical resolution. In the case of both FIG. 2 and FIG. 3 there will be some departure from the ideal temporal behaviour; taking contributions from multiple fields inevitably carries the risk of providing multiple images or blur of moving images. However, the visual effect is much improved because judder has been avoided.

Figure 4:
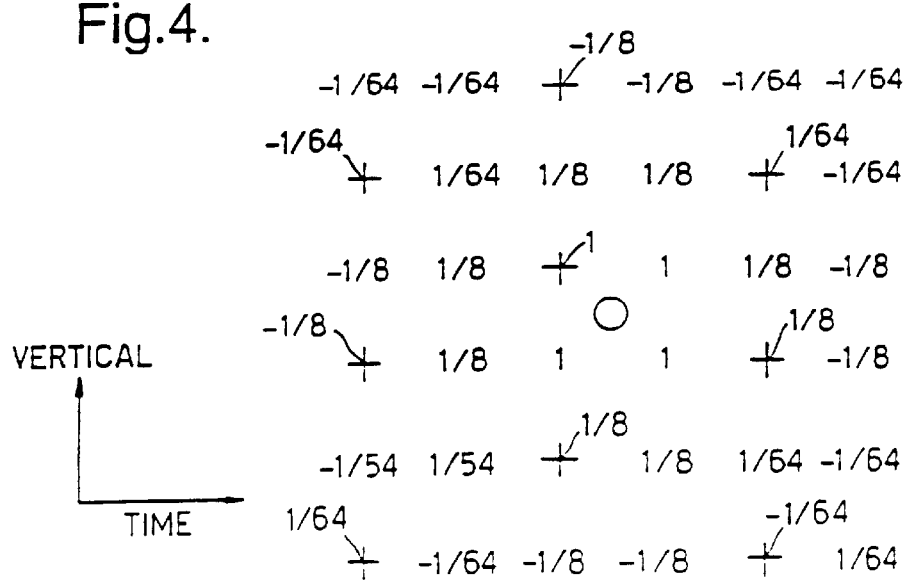
FIG. 4 is a diagram similar to FIGS. 2 & 3 (with arrowed lines omitted for the sake of clarity) illustrating a further modification.

Vertical resolution and temporal behaviour can be improved by modifying the weighting of the line contributions and an example is given in FIG. 4. In this figure, the arrowed lines leading from input lines to output lines have been omitted for the sake of clarity. As before, one set of input lines is marked +. It will be seen that in this arrangement, contributions are taken from three lines and from three fields. It will also be observed that certain weighting factors are negative. The desired result is in this way achieved that the contribution from the nearest line is unity, with the contributions from other lines summing algebraically to zero.

With an arrangement such as that exemplified in FIG. 4, judder and twitter in the image can be very much reduced as compared with known field-doubling up-converters. Indeed, the present invention recognizes that with this capacity for improving the displayed image, the desired level of performance can be achieved with an increase in field rate that falls short of field doubling.

It is found that flicker in displays becomes barely perceptible at frequencies above about 70 Hz and therefore, with the commonly-used field rates of 50 Hz and 60 Hz, a rate increase of one-and-a-half times is sufficient, provided that the conversion is done with the quality which is attainable when using techniques according to the present invention.

Figure 5:
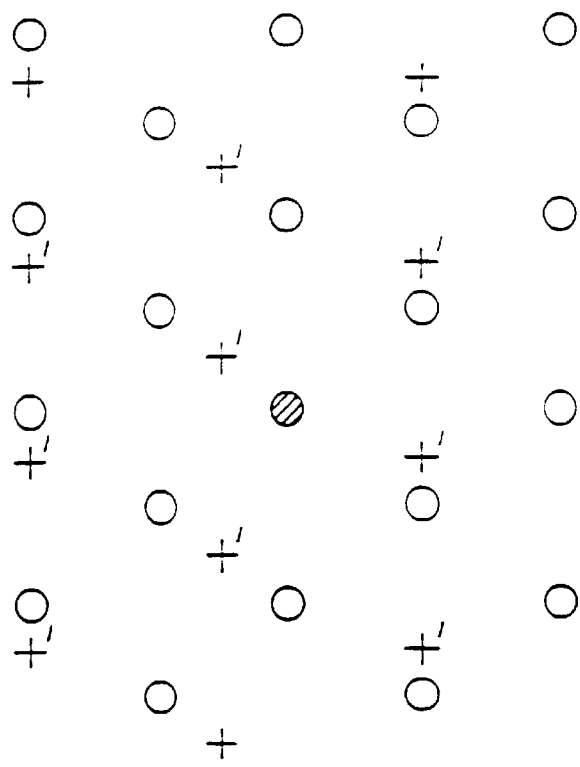
FIG. 5 is a diagram illustrating a method in accordance with a further embodiment of the present invention in which output fields are derived in a video display conversion which increases the field rate by one-and-a-half times.

Referring now to FIG. 5, a method is illustrated in which output field lines ○ are created at one-and-a-half times the field rate of the input field lines +. Each output line ○ is created using three input lines + from each of three fields. Thus, for example, the particular output line marked ● in FIG. 5, utilises information from up to nine input field lines marked +'. A convenient set of weighting coefficients is set out in Table I, below:

TABLE I

| -2  | -5  | -6 | 0   | +2  | 0   | -6 | -5  | -2  |
|-----|-----|----|-----|-----|-----|----|-----|-----|
| -11 | -10 | -1 | +11 | +17 | +11 | -1 | -10 | -11 |
| +2  | +14 | +37| +70 | +82 | +70 | +37| +14 | +2  |
| +2  | +14 | +37| +70 | +82 | +70 | +37| +14 | +2  |
| -11 | -10 | -1 | +11 | +17 | +11 | -1 | -10 | -11 |
| -2  | -5  | -6 | 0   | +2  | 0   | -6 | -5  | -2  |

[coefficients shown × 100]

It will be understood the appropriate 3×3 coefficients are selected from the full set of coefficients depending upon the location in time and space—or phase—of the output line to be created, relative to the available input lines. In this context, the relative phase is quantised to one of six values, hence the full set comprises 6×3×3=54 coefficients. The array of coefficients has symmetry about vertical and horizontal axes, thus simplifying the required processing.

In practical television displays, there is frequently an economic limit to the possible display line frequency. This is because stresses in the electrical components increase very rapidly as the line frequency is increased. For a given display line frequency, achieving the desired improvement in "temporal" performance with a field rate increase of ×1.5 instead of ×2, allows an increase in the number of lines per field. This improves the "spatial" performance by reducing visibility of the line structure.

Figure 6:
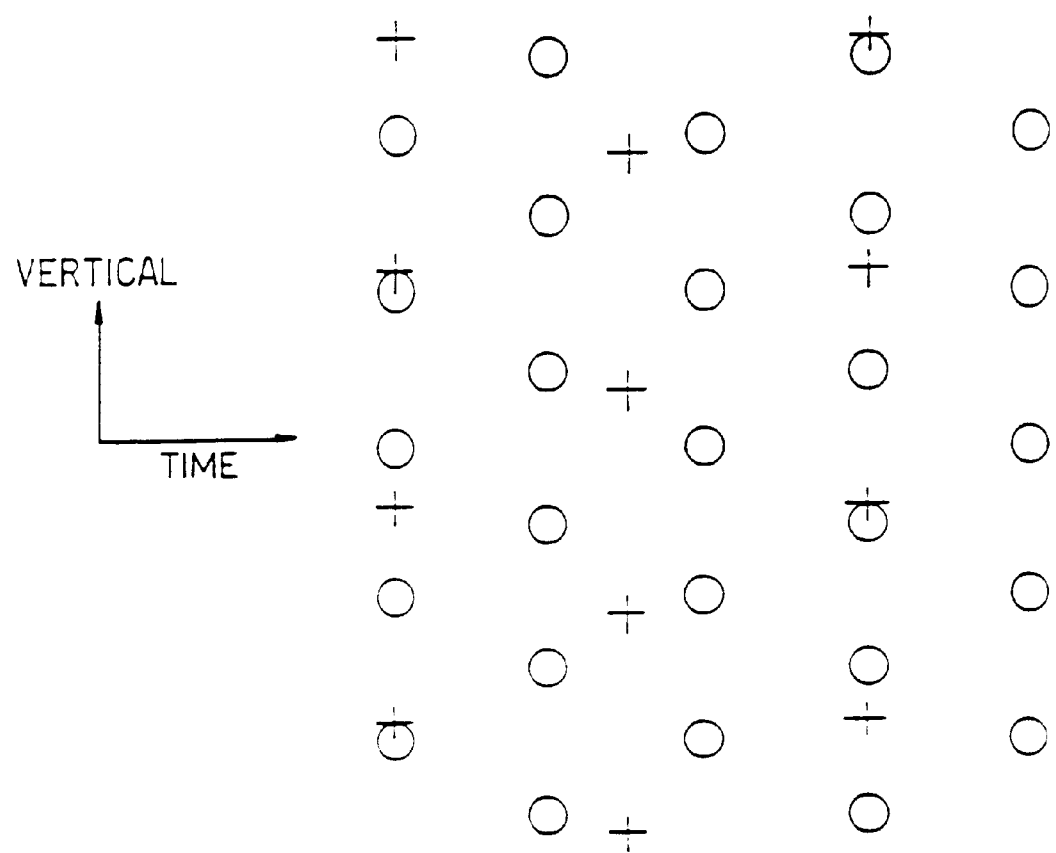
FIG. 6 is a diagram similar to FIG. 5, illustrating a further modification.

Referring to FIG. 6, an arrangement is illustrated in which the display conversion not only increases field rate by 1.5, but also increases by 1.5 the number of lines per field. There is accordingly a substantial improvement in "spatial" performance. The increase in overall display line frequency of 2.25 is—however—only marginally greater than that of a conventional, field-doubling display up-converter.

A suitable set of weighting coefficients is set out in Table II below:

TABLE II

| 0   | -2  | 2   | -2  | 0   |
|     | -5  | 0   | 0   | -5  |     |
| -6  | -8  | 0   | 0   | -8  | -6  |
|     | -10 | -2  | -2  | -10 |     |

TABLE II-continued

| -11 | -1  | +17 | -1  | -11 |
|     | -4  | +28 | +28 | -4  |     |
| -4  | +23 | +70 | +70 | +23 | -4  |
|     | +14 | +70 | +70 | +14 |     |
| +6  | +47 | +98 | +98 | +47 | +6  |
|     | +21 | +85 | +85 | +21 |     |
| +2  | +37 | +82 | +82 | +37 | +2  |
|     | +5  | +49 | +49 | +5  |     |
| -9  | +9  | +36 | +9  | -9  |
|     | -10 | +11 | +11 | -10 |     |
| -9  | -7  | +1  | -7  | -9  |
|     | -8  | -3  | -3  | -8  |     |
| -2  | -6  | +2  | -6  | -2  |
|     | -2  | +8  | +8  | -2  |     |

[coefficients shown × 100]

Again, the appropriate 3×3 coefficients are selected in dependence upon the phase of the output line relative to the available input lines. Because an output line can be created at any one of three locations vertically with respect to the input lines of a given field, there are 3×6 possible phase values and the full set of coefficients comprises 18×3×3=108 values.

It will be noted that at one point in the phase progression there is substantial coincidence of an output line with an input line, resulting in a weighting of 98% for that input line. It will also be noted that the array of coefficients has symmetry about a vertical axis.

It will be recognised that this invention has been described by way of examples only and a wide variety of further modifications are possible without departing from the scope of the invention.

Thus, field rate changes other than twice or one-and-a-half times can be accommodated and may offer advantages. There will usually be an increase in the number of coefficients required; if the number of theoretical coefficients becomes prohibitive, the "phase" of the conversion as described above, may be quantized. The increased display field rate of 72 Hz deserves special mention as it is a display rate widely used in computer displays. In some applications there will be an advantage in having a common display rate for video and computer based material.

The benefit has been mentioned of a display conversion which increases both the rate of field display and also the number of lines displayed per field, whilst remaining within an overall practical limit on display line frequency. The example quoted of an increase of one-and-a-half times in both the rate of field display and the number of lines displayed per field is but one instance of an arrangement where the product of the factors p and q for increase of field rate display and number of lines, respectively are with advantage kept between 2 and 3 or, preferably, between 2 and 2.5.

Apparatus according to this invention can be used to provide an output in a variety of formats to a variety of display devices including not only monitors but also projectors and video wall arrays. The apparatus will in certain cases be dedicated to a particular input format and a particular output format; more commonly, apparatus will be capable of accepting a range of input formats and will enable the user to select from a number of possible output formats. Thus, for example, a 625/50 input may be converted optionally to outputs such as 625/100; 1125/60; 1050/59.94; 875/75 or 787.5/60. It would also be possible to convert a 625/50 signal to a VGA signal such as 640×480/60. In a similar fashion, a 525/59.94 input may be converted to an output selected from 525/119.88 or 735/89.91.

The apparatus would hold, for example in PROM, the required filter coefficients for conversion between the current input format and the user-selected output.

In a modified arrangement, the user may select not an output standard as such but desired factors p and q for increase of field rate display and number of lines, respectively.

Figure 7:
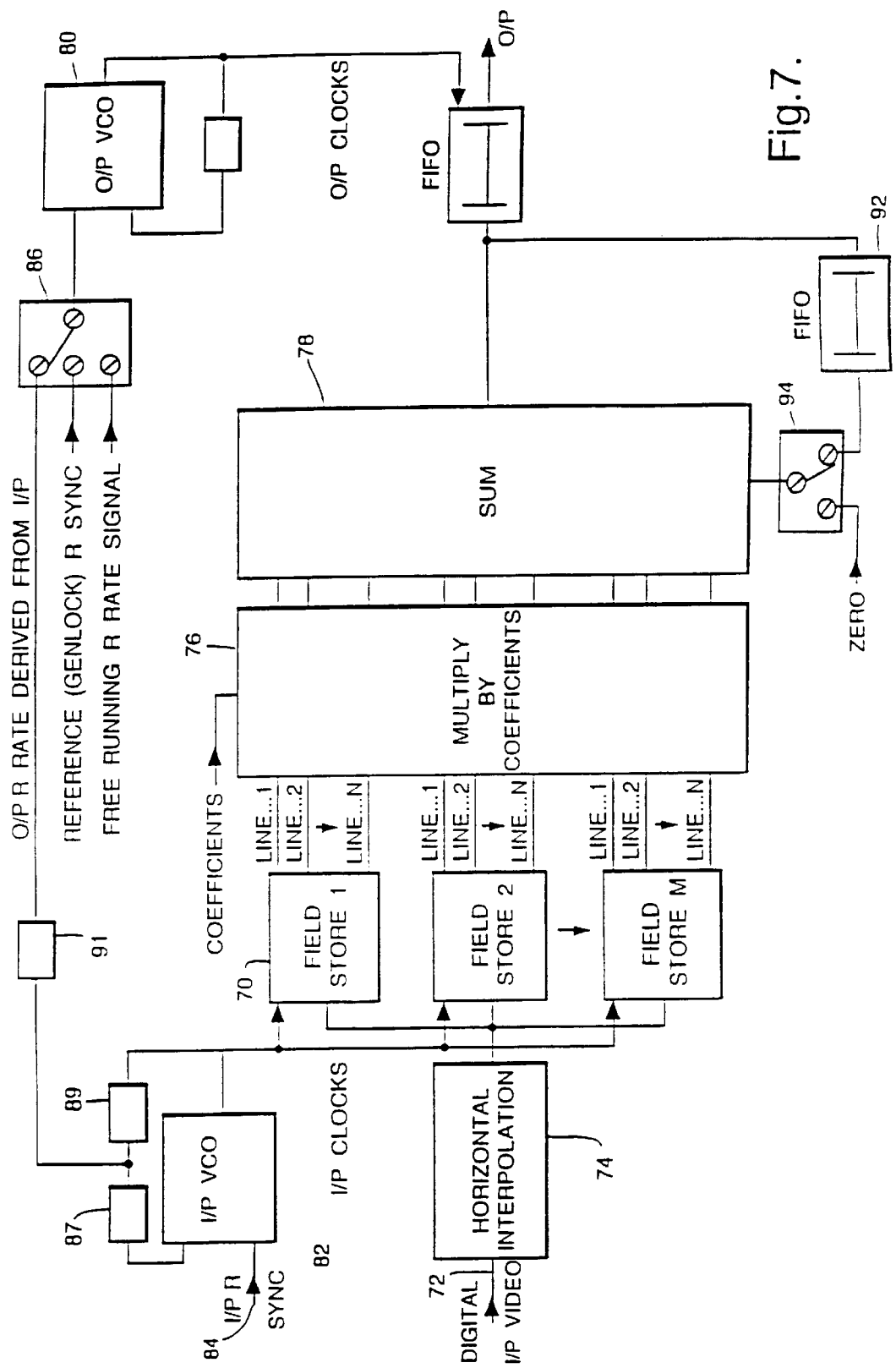
FIG. 7 is a block diagram illustrating apparatus in accordance with the present invention.

A specific example of apparatus according to the present invention is shown in FIG. 7.

This block diagram shows an implementation of the invention whereby M field stores 70 are used to store incoming data, received at digital video input terminal 72 and passing through horizontal interpolator 74. The field stores 70 are provided with taps arranged in such a way that data from N lines of each of M fields is made simultaneously available. Data from each tap is then multiplied in block 76 by coefficients which vary according to the relative positions of input and output lines and fields, as described hereinbefore. The resulting values are then summed in block 78 to form each output data value.

In this embodiment, output fields can optionally be locked in a fixed position (or a series of fixed positions) relative to input fields, even when the output field rate is a non-integer ratio of the input field rate (for example one and a half times). This is achieved using the output and input voltage controlled oscillators (VCOs), 80 and 82 respectively, which each produce line-locked clocks, in a known manner, using a feedback loop: a clock drives a counter or divider, such as output divider 81, which divides down to line rate to produce a signal which can be phased up with reference line syncs. On the input side, the VCO 82 receives reference syncs at input 84. On the output side, these reference syncs can be derived, through switcher 86, optionally from a genlock input, or from a free-running oscillator, or a divider running off the input clock. In the illustrated embodiment, this divider has been implemented by splitting the input VCO divider into two sections 87 and 89, providing a "common multiple" frequency which can then be further divided down at 91 to produce output line rate, while still allowing for such ratios as 2.1, 2.25, and so on. When this latter option is selected, input line length becomes a fixed multiple of output line length; thus the output field rate becomes a fixed multiple of input field rate, according to the number of lines in the output field. Locking the output fields in a fixed position relative to the input fields then becomes a matter of producing a "kick" pulse to reset the output line counter at an appropriate point in the sequence of input fields.

Locking output field positions in this way gives the advantage that only a limited set of coefficient phases are needed, so there is no need to store all the coefficient sets needed to ensure optimum performance with an arbitrary output field phasing. It also means, in the above architecture, that writing into the field stores can be kept clear of reading: hence visible over-write or over-read situations can be avoided while still using data from all the field stores simultaneously.

Also shown in FIG. 7 is an arrangement whereby the upconversion hardware can additionally be made to perform downconversion (to lower line rates) in an optimum way. In this situation, extra processing time is available because the interpolator can run at (at least) twice the required output line rate. Also, there is a requirement for a larger number of vertical taps in the interpolation, because N input lines now represents a relatively small vertical spacing in the output picture. Hence interpolation is performed at twice output line rate, and a First-In-First-Out memory (FIFO) 92 is used to store data to be fed back into the summing process. On the first half of each output line, half of the interpolation is done using N lines from each field. Then during the second half of each output line, the other half of the interpolation is done using another N input lines, and the previous result is added in. This is controlled in switcher 94. A FIFO 96 in the output data path allows reading out of this data at the requirement rate during the following line. In this way, the effective number of vertical taps has been doubled using the extra processing time.

We claim:

1. A method of video display conversion which increases the rate of field display, wherein every output field from the conversion is interpolated taking weighted sums of contributions from two or more input fields and the rate of field display is increased by one-and-a-half times.

2. A method according to claim 1, wherein output fields are interpolated each taking information from three input fields.

3. A method according to claim 1, wherein the number of lines per field is increased.

4. Video display conversion apparatus for receiving a sequence of input fields and providing output fields having an increased rate of field display, comprising field store means for making two or more input fields available and interpolator means adapted to create an output field by interpolation taking a weighted sum of contributions from two or more input fields, every output field being created through interpolation, wherein the rate of field display is increased by one-and-a-half times.

5. Apparatus according to claim 4, wherein output fields are interpolated each taking information from three input fields.

6. Apparatus according to claims 4, wherein the number of lines per field is increased.

7. A method of video display conversion which increases the rate of field display by a factor p and increases the number of lines per field by a factor q, wherein every output field line is interpolated from at least one input field line from each of at least two input fields.

8. A method according to claim 7, wherein each output field line is interpolated from at least three input field lines from each of at least three input fields.

9. A method according to claim 7, wherein at least one of p and q is non-integral.

10. A method of video display conversion which increases the rate of field display by a factor p and increases the number of lines per field by a factor q, wherein each output field line is interpolated from at least one input field line from each of at least two input fields, wherein both p and q are non-integral.

11. A method of video display conversion which increases the rate of field display by a factor p and increases the number of lines per field by a factor q, wherein each output field line is interpolated from at least one input field line from each of at least two input fields and wherein the product of the factors p,q is between 2 and 3.

12. A method according claim 11, wherein factors p,q is between 2 and 2.5.

13. A method of video display conversion which increases the rate of field display by a factor p and increases the number of lines per field by a factor q, wherein each output field line is interpolated from at least one input field line from each of at least two input fields, whereby input and output fields are locked together by a method of deriving output line lengths as a function of input line lengths divided by factors p and q.

14. Video display conversion apparatus which serves to increase the rate of field display by a factor p and increase the number of lines per field by a factor q, comprising interpolator means so adapted that each output field line is interpolated from at least one input field line from each of at least two input fields.

15. Apparatus according to claim 14, wherein each output field line is interpolated from at least three input field lines from each of at least three input fields.

16. Apparatus according to claim 14, wherein at least one and preferably both of p and q is non-integral.

17. Video display conversion apparatus which serves to increase the rate of field display by a factor p and increase the number of lines per field by a factor q, comprising interpolator means so adapted that each output-field line is interpolated from at least one input field line from each of at least two input fields, wherein the product of the factors p,q is between 2 and 3, and preferably between 2 and 2.5.

18. Apparatus according to claim 17, wherein output fields are interpolated each taking information from three input fields.

19. Apparatus according to claim 17, enabling the user to select factors p and q.

20. Apparatus according to claim 17, wherein an output format is selected and there are held in store for said interpolator means the required filter coefficients for conversion between the input format and the selected output format.

21. Apparatus according to claim 20, wherein the output format comprises a computer display format.

22. Video display conversion apparatus which serves to increase the rate of field display by a factor p and increase the number of lines per field by a factor q, comprising interpolator means so adapted that each output field line is interpolated from at least one input field line from each of at least two input fields, comprising divider means connected such that input and output fields are locked together by a method of deriving output line length as a function of input line length divided by factors p and q.

23. Video display conversion apparatus which serves to increase the rate of field display by a factor p and increase the number of-lines per field by a factor q, comprising interpolator means so adapted that each input field line is interpolated from at least one input field line from each of at least two input fields, further comprising data recirculating means providing the additional capacity of performing down conversion with the product of factors p and q being less than one, by recirculating data to increase the number of vertical or temporal taps used in interpolating each output point.

24. A method of video display conversion which increases the rate of field display by a factor p and increases the number of lines per field by a factor q, wherein each output field line is interpolated from at least one input field line from each of at least two input fields and wherein at least one of p and q is non-integral.

25. A method of video display conversion in which the field rate of an input video signal is increased by a non-integral multiplier p to a computer display rate, by the use of interpolation, to provide a common display rate for video and computer based material.

26. A method according to claim 25, wherein the computer display rate is 72 Hz.

27. A method according to claim 25, wherein an input video signal is converted to the format of a VGA signal.

28. A method of video display conversion which receives a video signal having a field rate of 50 Hz, 60 Hz or 59.94 Hz and increases the field rate for display by a non-integral multiplier, by the use of interpolation.

29. A method according to claim 28, wherein every field outputted for display contains field lines that have been created through interpolation.

30. A method according to claim 28, wherein substantially every field line in every output field is created through interpolation.

31. Video display conversion apparatus for receiving a sequence of input fields and providing output fields having an increased rate of field display, comprising field store means for making two or more input fields available and interpolator means adapted to create an output field by interpolation taking a weighted sum of contributions from two or more input fields, the rate of field display being increased by a non-integral factor.

32. Apparatus according to claim 31, wherein said interpolator means is adapted to create an output field by interpolation taking a weighted sum of contributions from three input fields.

33. Apparatus according to claim 31, wherein the number of lines per field is increased.

34. A method of video display conversion, which operates on a sequence of input fields each made up of input field lines, to produce a sequence of output fields made up of output field lines, wherein every output field line is interpolated by taking a weighted sum of at least one input field line from each of two input fields.

35. A method according to claim 34, wherein said output field line is aligned spatially with none of said input field lines.

36. A method according to claim 34, wherein the rate of field display is increased by a factor p and the number of lines per field is increased by a factor q.

37. A method according to claim 36, wherein at least one of p and q is non-integral.

38. A method according to claim 37, wherein both of p and q are non-integral.

39. A method according to claim 36, wherein the product of the factors p, q is between 2 and 3.

40. A method according claim 39, wherein the product of the factors p, q is between 2 and 2.5.

41. A method according to claim 34, whereby input and output fields are locked together by a method of deriving output line length as a function of input line length divided by factors p and q.

* * * * *